United States Patent
Vandewiele

(10) Patent No.: US 7,778,368 B2
(45) Date of Patent: Aug. 17, 2010

(54) APPARATUS FOR RECEIVING SIGNALS VIA CHANNELS

(75) Inventor: Bertrand Jacques Leonard Vandewiele, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 868 days.

(21) Appl. No.: 11/629,057

(22) PCT Filed: Jun. 10, 2005

(86) PCT No.: PCT/IB2005/051787

§ 371 (c)(1),
(2), (4) Date: Dec. 8, 2006

(87) PCT Pub. No.: WO2005/122454

PCT Pub. Date: Dec. 22, 2005

(65) Prior Publication Data

US 2008/0031125 A1    Feb. 7, 2008

(30) Foreign Application Priority Data

Jun. 10, 2004    (EP) ................................. 04102645

(51) Int. Cl.
*H04B 1/10*    (2006.01)
(52) U.S. Cl. ..................... 375/349; 375/219; 375/221; 375/222; 375/260; 375/267; 375/299; 375/347
(58) Field of Classification Search ............... 375/219, 375/221, 222, 260, 267, 299, 347, 349

See application file for complete search history.

(56) References Cited

U.S. PATENT DOCUMENTS 6,963,619 B1 * 11/2005 Gesbert et al. ............... 375/267
7,116,632 B2 * 10/2006 Alapuranen .................. 370/208

(Continued)

FOREIGN PATENT DOCUMENTS

WO    WO 03/100986    12/2003

OTHER PUBLICATIONS

Cristoff Martin et al: "Analytic Approximations of Eigenvalue Moments and Mean Channel . . . "; Proceedings of IEEE International Conference on Acostics, Speech, and Signal; pp. 2389-2392 vol. 3 2002.

(Continued)

*Primary Examiner*—Chieh M Fan
*Assistant Examiner*—Siu M Lee

(57) ABSTRACT

An apparatus (1) comprising a receiver (20) for receiving signals via channels defined by a channel transfer matrix H and a transmitter (10) is provided with a channel estimator (30) for generating first and second channel estimation information and a correlator estimator (31) for correlating the first and second channel estimation information with each other and for, in response to a correlation, generating a correlation factor and a transmitting feedback unit (32) for, in dependence of the correlation factor, estimating eigenparameters of a covariance matrix $HH^H$ and for, in response to an estimation, generating feedback information and a receiving feedback unit (33) for receiving the feedback information for adjusting the transmitter (10), to avoid complex matrix processes and to get the feedback information in a simple way. A power estimator (34) estimates a first and second power value for the first and second channel estimation information for normalizing the correlation factor. The estimated eigenparameters comprise estimated eigenvalues and/or estimated eigenvectors.

20 Claims, 8 Drawing Sheets

U.S. PATENT DOCUMENTS

| | | | | |
|---|---|---|---|---|
| 7,130,580 | B2* | 10/2006 | Alexiou et al. | 455/39 |
| 7,170,925 | B2* | 1/2007 | Kawaguchi et al. | 375/148 |
| 7,236,538 | B1* | 6/2007 | Banister | 375/267 |
| 2001/0036221 | A1* | 11/2001 | Sato | 375/147 |
| 2003/0043929 | A1* | 3/2003 | Sampath | 375/267 |
| 2004/0001556 | A1* | 1/2004 | Harrison et al. | 375/267 |
| 2004/0185909 | A1* | 9/2004 | Alexiou et al. | 455/562.1 |

OTHER PUBLICATIONS

J. Ho et al: "A Quick Simulation Method for Fading Communications Channels . . . "; Proceedings VTC 2002-Fall Conf. 2002 Vehicular Tech.; pp. 449-453 vol. 1 2002.

Hemanth Sampath et al. : Linear Precoding for Space-Time Coded Systems . . . :Communications Letters IEEE 2002; pp. 239-241 vol. 6 Issue 6, Jun. 2002.

* cited by examiner

APPARATUS FOR RECEIVING SIGNALS VIA CHANNELS

The invention relates to an apparatus comprising a receiver for receiving signals via channels defined by a channel transfer matrix H and comprising a transmitter, and also relates to a device, to a receiver, to a transmitter, to a method and to a processor program product.

Examples of such an apparatus are wireless local area network cards for example in the form of multiple input multiple output systems, and examples of such a device are personal computers and other terminals.

A prior art apparatus is known from WO 03/100986 A2, which discloses a multiple input multiple output system with a transmitter and a receiver. The receiver comprises a channel estimation unit for generating channel estimation information. This channel estimation information is supplied to a singular value decomposition unit and to a link adaptation unit. The latter further receives singular value decomposition information from the singular value decomposition unit and generates feedback information. This feedback information is supplied to the transmitter for adjusting this transmitter.

To be able to generate the channel estimation information, the singular value decomposition information and the feedback information, these units all process matrices. Such processes are complex.

The known apparatus is disadvantageous, inter alia, owing to the fact that it is relatively complex.

It is an object of the invention, inter alia, to provide an apparatus which is relatively simple.

Furthers objects of the invention are, inter alia, to provide a device, a receiver, a transmitter, a method and a processor program product which are relatively simple.

The apparatus according to the invention is defined by comprising a receiver for receiving signals via channels defined by a channel transfer matrix H and comprising a transmitter, which receiver comprises:

a channel estimator for generating first and second channel estimation information;

a correlator estimator for correlating the first and second channel estimation information with each other and for, in response to a correlation, generating a correlation factor; and a transmitting feedback unit for, in dependence of the correlation factor, estimating eigenparameters of a covariance matrix $HH^H$ and for, in response to an estimation, generating feedback information;

and which transmitter comprises:

a receiving feedback unit for receiving the feedback information for adjusting the transmitter.

By letting the correlator estimator correlate at least the first and second channel estimation information each for example comprising 64 values, for example one correlation factor is obtained. The transmitting feedback unit estimates the eigenparameters for example solely in dependence of this correlation factor and in response generates the feedback information destined for the transmitter. As a result, compared to the prior art apparatus, many complex matrix processes are avoided (single value decompositions are no longer needed), and the apparatus according to the invention is more simple. This is a great advantage. The channel estimator may further generate third and fourth channel estimation information etc., which third and fourth channel estimation information may be involved in the correlation and/or in a further correlation etc.

The documents "Analytic approximations of eigenvalue moments and mean channel capacity for multi input multi output channels" by Martin, C. And Ottersen, B. of the Proceedings (ICASSP '02) IEEE International Conference on Acoustics, Speech, and Signal Processing, page III-2389-III-2392 vol. 3, "A quick simulation method for fading communications channels using a novel eigenvalue importance sampling technique" by Ho, J. T. Y. and Smith, P. J. of the Proceedings VTC 2002-Fall Conference, 2002 Vehicular Technology, page 449-453, vol. 1, 2002, and "Linear precoding for space-time coded systems with known fading correlations" by Sampath, H. and Paulraj, A. of the Communications Letters, IEEE, page 239-241, vol. 6, issue 6, June 2002 all disclose background calculations for multiple input multiple output systems.

An embodiment of the apparatus according to the invention is defined by the first and second channel estimation information having been fourier transformed. Thereto, for example the channel estimator comprises a fourier transformer such as for example a fast fourier transformer, and a fourier transformer in the correlator estimator can be avoided advantageously.

An embodiment of the apparatus according to the invention is defined by the first and second channel estimation information having not been fourier transformed and being fourier transformed in the correlator estimator before the correlation is done. Thereto, the correlator estimator for example comprises a fourier transformer such as for example a fast fourier transformer, and a fourier transformer in the channel estimator can be avoided advantageously.

An embodiment of the apparatus according to the invention is defined by the receiver further comprising:

a power estimator for estimating a first and second power value for the first and second channel estimation information for normalizing the correlation factor. The power estimator allows the correlation factor to be normalized advantageously.

An embodiment of the apparatus according to the invention is defined by the estimated eigenparameters comprising estimated eigenvalues, a maximum estimated eigenvalue equalizing a sum of a first factor and a product, which product equalizes the correlation factor multiplied by a second factor, and a minimum estimated eigenvalue equalizing a difference between a third factor and the maximum estimated eigenvalue. The first factor for example equals 3.5, the second factor for example equalizes 0.5, and the third factor for example equalizes 4. The correlation factor preferably comprises the normalized correlation factor. Under these conditions, the quality/efficiency relation of the performance of the transmitting feedback unit is best with respect to the eigenvalues.

An embodiment of the apparatus according to the invention is defined by the estimated eigenparameters comprising estimated eigenvectors, a first estimated eigenvector equalizing a first product of a fourth factor and a square root of the correlation factor, and a second estimated eigenvector equalizing a sum of a fifth factor and a second product, which second product equalizes a sixth factor multiplied by a third product, which third product equalizes the correlation factor multiplied by itself. The fourth factor for example equalizes $-\pi/4$ ($\pm 20\%$), the fifth factor for example equalizes 0.7 ($\pm 20\%$), the sixth factor for example equalizes 0.3 ($\pm 20\%$). The correlation factor preferably comprises the normalized correlation factor. Under these conditions, the quality/efficiency relation of the performance of the transmitting feedback unit is best with respect to the estimated eigenvectors.

An embodiment of the apparatus according to the invention is defined by the feedback information comprising the estimated eigenparameters. The receiving feedback unit will then process the estimated eigenparameters comprising the estimated eigenvalues and/or the estimated eigenvectors. This keeps the transmitting feedback unit efficient, with the amount of feedback information being at a higher level.

An embodiment of the apparatus according to the invention is defined by the feedback information comprising a code which depends on the correlation factor. The transmitting feedback unit will then process the estimated eigenparameters comprising the estimated eigenvalues and/or the estimated eigenvectors. This keeps the receiving feedback unit efficient, with the amount of feedback information being at a lower level. The code for example instructs the apparatus to use either a multiple input multiple output technology or to use an ordinary (antenna) diversity technology or both.

An embodiment of the apparatus according to the invention is defined by the transmitter further comprising:

a selector for, in dependence of the feedback information, selecting a transmitter adjustment.

This transmitter adjustment may comprise a selection of a transmitter algorithm or a selection of a transmitter mode.

The device according to the invention is defined by comprising an apparatus comprising a receiver for receiving signals via channels defined by a channel transfer matrix H and comprising a transmitter, which receiver comprises:

a channel estimator for generating first and second channel estimation information;

a correlator estimator for correlating the first and second channel estimation information with each other and for, in response to a correlation, generating a correlation factor; and a transmitting feedback unit for, in dependence of the correlation factor, estimating eigenparameters of a covariance matrix $HH^H$ and for, in response to an estimation, generating feedback information;

and which transmitter comprises:

a receiving feedback unit for receiving the feedback information for adjusting the transmitter.

The receiver according to the invention for receiving signals via channels defined by a channel transfer matrix H for use in an apparatus further comprising a transmitter is defined by the receiver comprising:

a channel estimator for generating first and second channel estimation information;

a correlator estimator for correlating the first and second channel estimation information with each other and for, in response to a correlation, generating a correlation factor; and a transmitting feedback unit for, in dependence of the correlation factor, estimating eigenparameters of a covariance matrix $HH^H$ and for, in response to an estimation, generating feedback information.

The transmitter according to the invention for use in an apparatus further comprising a receiver for receiving signals via channels defined by a channel transfer matrix H is defined by the receiver comprising:

a channel estimator for generating first and second channel estimation information;

a correlator estimator for correlating the first and second channel estimation information with each other and for, in response to a correlation, generating a correlation factor; and a transmitting feedback unit for, in dependence of the correlation factor, estimating eigenparameters of a covariance matrix $HH^H$ and for, in response to an estimation, generating feedback information;

and which transmitter comprises:

a receiving feedback unit for receiving the feedback information for adjusting the transmitter.

The method according to the invention for use in an apparatus for receiving signals via channels defined by a channel transfer matrix H is defined by the method comprising the steps of:

generating first and second channel estimation information;

correlating the first and second channel estimation information with each other, in response to a correlation, generating a correlation factor;

in dependence of the correlation factor, estimating eigenparameters of a covariance matrix $HH^H$;

in response to an estimation, generating feedback information for adjusting the apparatus.

The processor program product according to the invention for use in an apparatus for receiving signals via channels defined by a channel transfer matrix H is defined by the processor program product comprising the functions of:

generating first and second channel estimation information;

correlating the first and second channel estimation information with each other, in response to a correlation, generating a correlation factor;

in dependence of the correlation factor, estimating eigenparameters of a covariance matrix $HH^H$;

in response to an estimation, generating feedback information for adjusting the apparatus.

Embodiments of the device according to the invention and of the receiver according to the invention and of the transmitter according to the invention and of the method according to the invention and of the processor program product according to the invention correspond with the embodiments of the apparatus according to the invention.

The invention is based upon an insight, inter alia, that complex matrix processes are to be avoided as much as possible, and is based upon a basic idea, inter alia, that a correlator estimator is to be used for reducing the channel estimation information to a preferably single correlation factor, which correlation factor is to be used for the feeding back process.

The invention solves the problem, inter alia, to provide an apparatus which is relatively simple, and is advantageous, inter alia, in that a realization has become possible of multiple input multiple output systems which are currently considered to be far too complex. Compared to prior art water-filling technologies, most of the water-filling advantages are preserved at a reduced amount of feedback information.

These and other aspects of the invention will be apparent from and elucidated with reference to the embodiments(s) described hereinafter.

Figure 1:
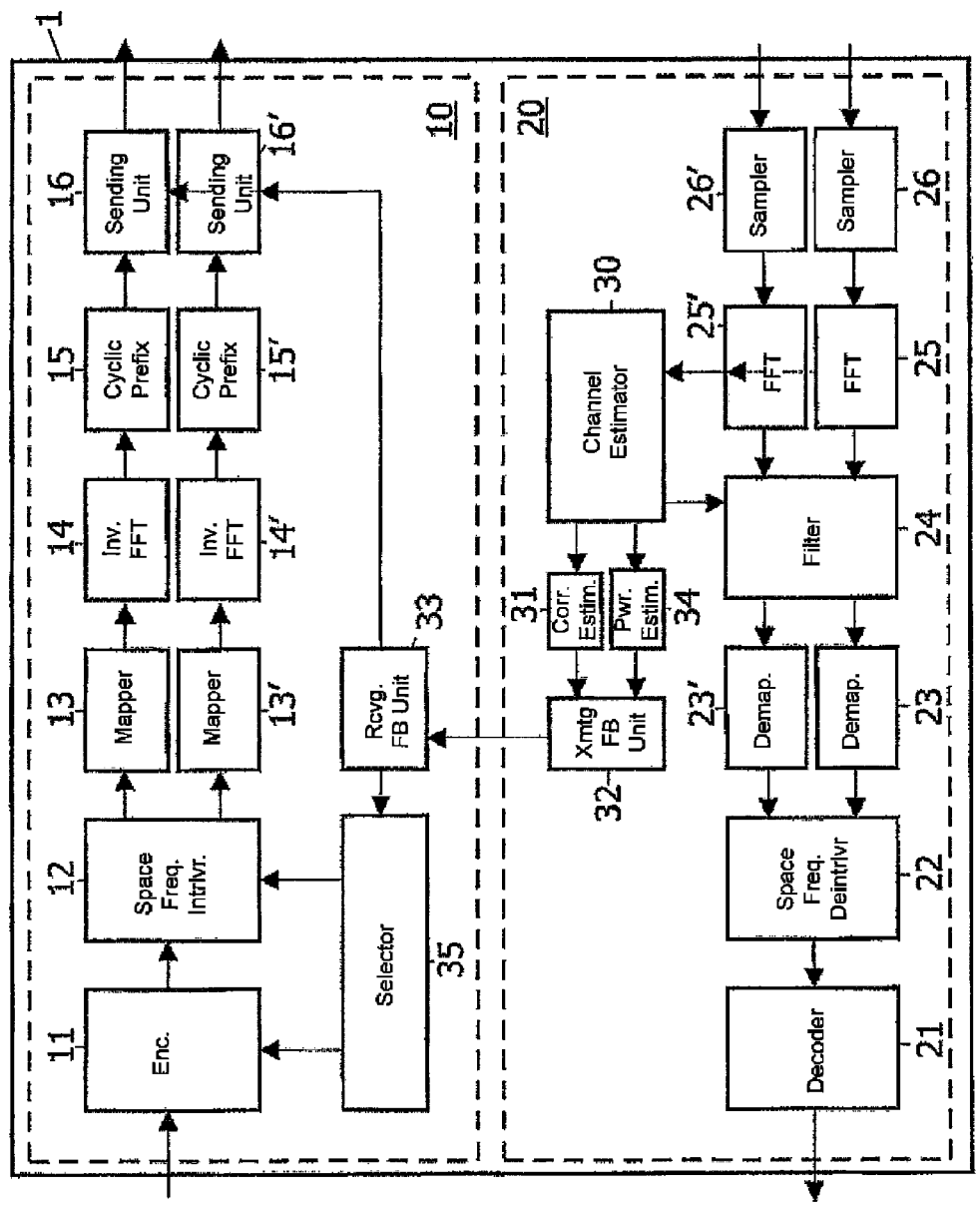
FIG. 1 shows diagrammatically an apparatus according to the invention comprising a receiver according to the invention and a transmitter according to the invention.

The apparatus 1 according to the invention shown in FIG. 1 such as for example a wireless local area network card for example in the form of a multiple input multiple output system comprises a receiver 20 and a transmitter 10. The transmitter 10 comprises an encoder 11 for encoding information to be transmitted. An output of the encoder 11 is coupled to an input of a space frequency interleaver 12. Outputs of the space frequency interleaver 12 are coupled to inputs of mappers 13,13', of which outputs are coupled to inputs of inverse fast fourier transformers 14,14'. Outputs of the inverse fast fourier transformers 14,14' are coupled to inputs of cyclic prefix units 15,15', of which outputs are coupled to inputs of sending units 16,16' for sending for example radio frequency signals via antennas not shown and via channels not shown to an other apparatus not shown.

The receiver 20 comprises sampling units 26,26' for receiving for example radio frequency signals via channels not shown and via antennas not shown from an other apparatus not shown. Outputs of the sampling units 26,26' are coupled to inputs of fast fourier transformers 25,25', of which outputs are coupled to inputs of a filter 24. Outputs of the filter 24 are coupled to inputs of demappers 23,23', of which outputs are coupled to inputs of a space frequency de-interleaver 22. An output of the space frequency de-interleaver 22 is coupled to an input of a decoder 21 for decoding the information received.

The receiver 20 further comprises a channel estimator 30 of which an input is coupled to the fast fourier transformers 25,25'. A first output of the channel estimator 30 is coupled to an input of a correlator estimator 31 and a second output of the channel estimator 30 is coupled to an input of a power estimator 34. An output of the correlator estimator 31 and an output of the power estimator 34 are coupled to inputs of a transmitting feedback unit 32. An output of the transmitting feedback unit 32 is coupled to an input of a receiving feedback unit 33 in the transmitter 10, of which receiving feedback unit 33 a first output is coupled to a selector 35 and a second output is coupled to the sending units 16,16'.

Figure 2:
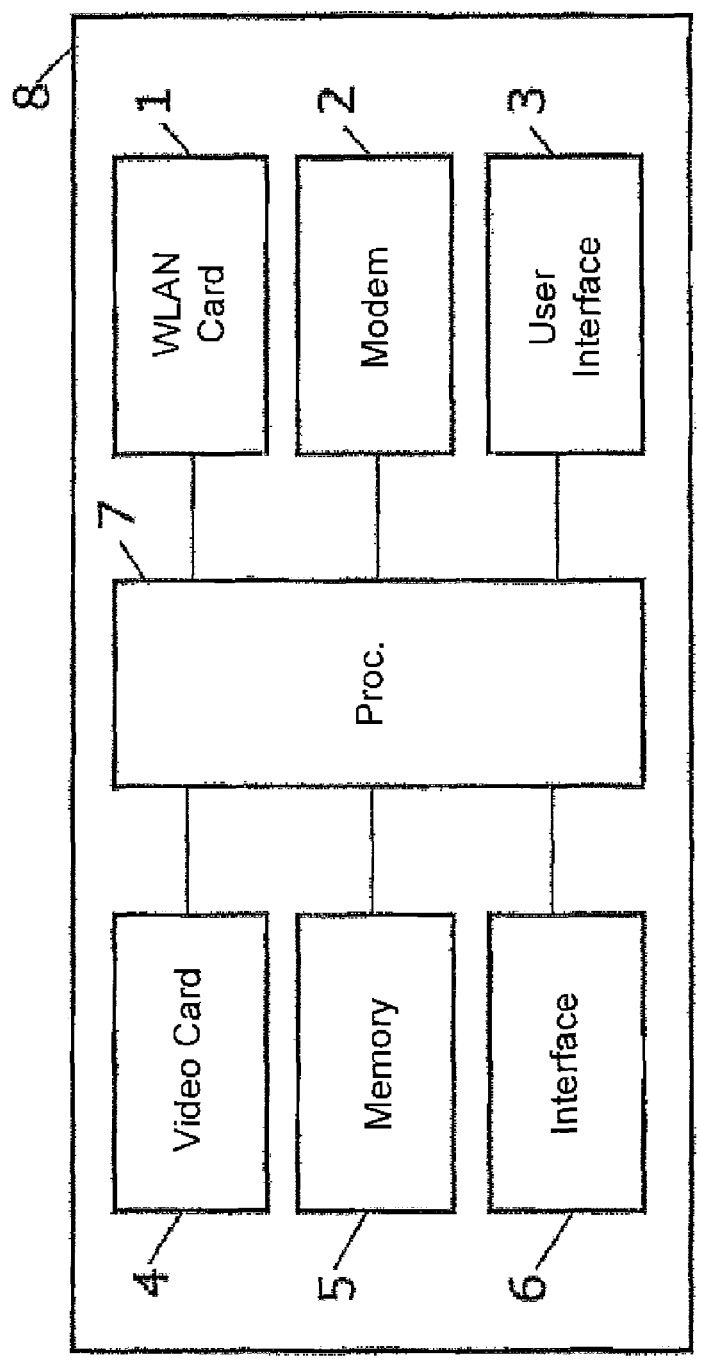
FIG. 2 shows diagrammatically a device according to the invention comprising an apparatus according to the invention.

The device 8 according to the invention shown in FIG. 2 such as for example a personal computer or an other terminal comprises a processor 7 coupled to the apparatus 1, to a modem 2, to a man-machine-interface 3, to a video card 4, to a memory 5 and to an interface 6.

A multiple input multiple output system has a transmission model given by:

$$\underline{r} = H\underline{x} + \underline{n} \quad (1)$$

with H being a channel transfer matrix with elements $h_{ij}$, $\underline{x}$ being a vector of a dimension $N_{tx}$ by 1 containing transmitted symbols, $\underline{n}$ being a vector modeling the noise, and $\underline{r}$ being a received signal vector of dimension $N_{rx}$ by 1. $N_{tx}$ denotes for example a number of transmitted antenna signals and/or a number of transmitting antennas and $N_{rx}$ denotes for example a number of received antenna signals and/or a number of receiving antennas.

By using the Shannon equation:

$$C = \log_2 \det\left(I + \frac{SNR}{N_{Tx}} HH^H\right) \text{bit/Hz/s} \quad (2)$$

it is possible to calculate a channel capacity of one specific channel realization by transforming measured impulse responses into a frequency domain, applying the equation above per frequency f and integrating over the capacities obtained per frequency f.

By calculating the eigenvalues $\lambda_i$ of the covariance matrix $[HH^H]$, (2) can be rewritten with m=min(Ntx,Nrx) as:

$$C = \sum_{i=1}^{m} \log_2\left(1 + \frac{SNR}{N_{Tx}}\lambda_i\right) \text{bit/Hz/s} \quad (3)$$

The capacity is therefore dependent on the normalized SNR multiplied by the eigenvalues or the normalized SNR multiplied by the covariance matrix $[HH^H]$. Since optimum performance is achieved by adapting the transmit power to the eigenvalues, a single values decomposition for every channel matrix estimated at the receiver 20 and the feedback of all those eigenvalues and associated eigenvectors in order to adapt the power at the transmitter 10 is needed. This is not possible in practice especially for multi-carriers system where the SNR and eigenvalues/eigenvectors need to be calculated on a per carrier basis.

A multiple input multiple output orthogonal frequency division multiplexing system with Nc carriers will require Nc SNR estimations/Nc single values decompositions of the covariance matrix $[HH^H]$ and the same amount of feedback. Also the single values decomposition calculation is extremely complex to implement in hardware and often seen as unpractical.

It has been found out that an adaptation of the power in the space dimension pays more than in the frequency dimension, which means that the feedback and adaptation may be averaged out on the Nc carriers. A partial statistical measure should be enough. Instead of performing the single values decomposition, according to the invention a correlation factor between the elements of the H matrix (the channel estimation information) is to be derived, and only this statistical information needs to be fed back, or a coded version thereof. Furthermore, this simple correlation factor can be used as a simple criterion to switch an algorithm at the transmitter 10 because for high correlation values spatial multiplexing may fail. The table below gives the results for H having its elements Rayleigh distributed and $N_{tx}=N_{rx}=(2,2)$, SNR=20 dB, whereby λ denotes the estimated eigenvalue and Rho denotes the correlation factor.

| | SNR 20 dB | | | |
|---|---|---|---|---|
| Rho | mean($\lambda_{max}$)/mean($\lambda_{min}$) | mean($\lambda_{min}$) | mean($\lambda_{max}$) | mean Capacity |
| 0.100 | 8.481 | 0.423 | 3.588 | 10.358 |
| 0.200 | 8.842 | 0.400 | 3.533 | 10.283 |
| 0.300 | 9.990 | 0.368 | 3.676 | 10.181 |
| 0.400 | 11.622 | 0.318 | 3.691 | 9.979 |
| 0.500 | 14.469 | 0.255 | 3.694 | 9.698 |
| 0.600 | 19.081 | 0.200 | 3.810 | 9.438 |
| 0.700 | 28.165 | 0.137 | 3.845 | 8.960 |
| 0.800 | 9.990 | 0.078 | 3.889 | 8.327 |
| 0.900 | 143.011 | 0.028 | 3.961 | 7.455 |

From this table it can be derived that the higher correlation factor (Rho) is, the lower the capacity is and the more distance there is between the highest and lowest estimated eigenvalues λ. (3) can be rewritten for a (2,2) case to get (4):

$$C = \log_2\left(1 + \frac{SNR}{N_{Tx}}\lambda_{max}\right) + \log_2\left(1 + \frac{SNR}{N_{Tx}}\lambda_{min}\right) \quad (4)$$

Figure 3:
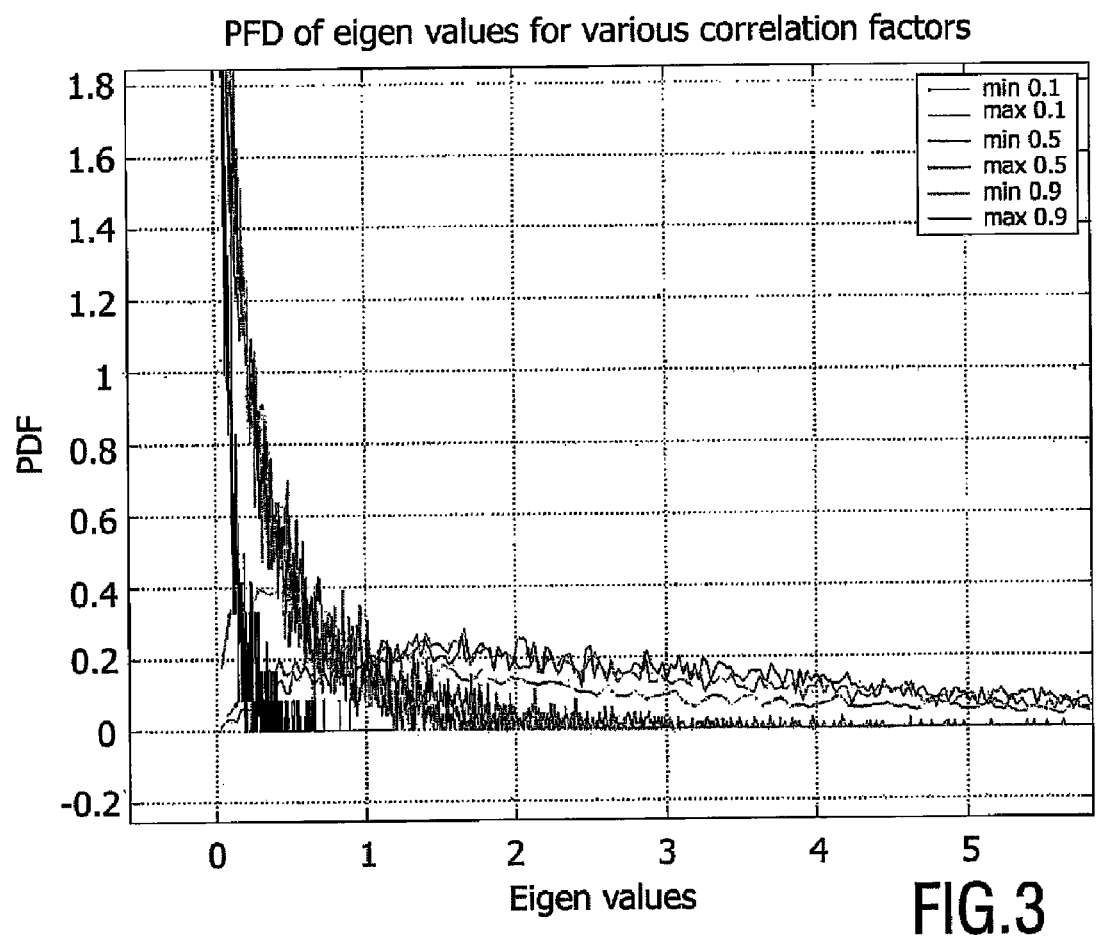
FIG. 3 shows a probability density function of estimated eigenvalues for various correlation factors for a Rayleigh fading case.

FIG. 3 shows a probability density function of estimated eigenvalues for various correlation factors. Clearly, when the correlation increases the contribution of the smallest estimated eigenvalue is lower. By derivation of (4) and taking into account that the sum of the estimated eigenvalues on average will be 4 for a (2,2) case, clearly the optimum capacity is achieved for $\lambda_{max}=\lambda_{min}=2$. With a Rayleigh distribution of the elements in H, the largest eigenvalue approaches a $\chi^2$ distribution with 2N degrees of freedom whereas the smallest eigenvalue approaches a $\chi^2$ with two degrees, or a Rayleigh distribution. Therefore, the smallest estimated eigenvalue always give a small contribution to the capacity. The mean value for the smallest estimated eigenvalue is around 0.5 while it is 3.5 for the highest as can be derived from the table above and FIG. 3.

Figure 4:
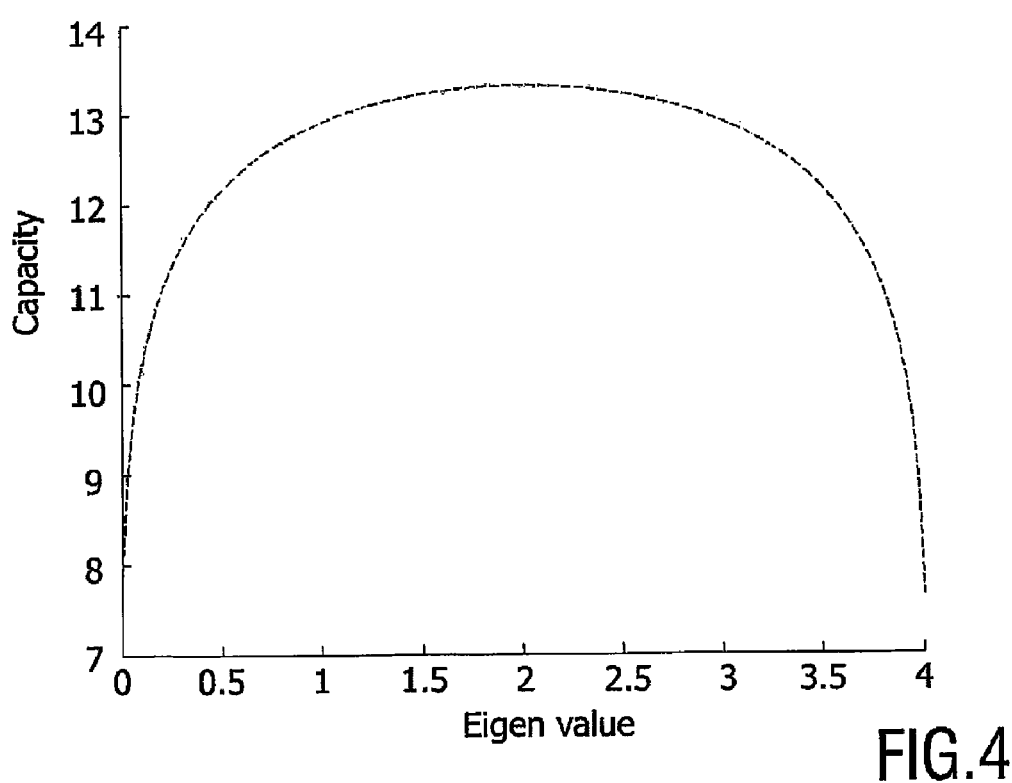
FIG. 4 shows a capacity of a (2,2) multiple input multiple output system for a signal to noise ratio of 20 dB as a function of an estimated eigenvalue.

FIG. 4 shows a capacity of a (2,2) multiple input multiple output system for a signal to noise ratio of 20 dB as a function of an estimated eigenvalue. From this plot it becomes clear that (for a 20 dB SNR) ideally the largest estimated eigenvalue should be below 3.0 in order to not degrade the capacity. If it is higher than 3.5 than the capacity is quickly degraded since the curve becomes steep between 3.5 and 4.0.

The following can be observed. Firstly, if one of the estimated eigenvalues tends to be much larger than the rest (keyhole effect), then it is useless to exploit advanced diversity techniques that try to use all of them. Secondly, to give a reliable contribution to capacity, the probability density should vanish as fast as possible for the estimated eigenvalue that tends to zero. The estimated eigenvalues of $HH^H$ and the correlation values of H are closely related and therefore simple correlation estimation is accurate enough to make efficient adaptive multiple input multiple output systems.

For a (2,2) multiple input multiple output orthogonal frequency division multiplexing system, the channel matrix H=[h1,h2;h3,h4] on a per carrier basis. The correlation value of, for example, h1 and h2 can be calculated by a convolution product Rho=conv(h1,h2). The correlation and covariance are related and the covariance function is defined as:

$$cov(x1,x2)=E[(x1-\mu1)(x2-\mu2)] \quad (5)$$

where E[.] is the mathematical expectation and $\mu i=E[xi]$.

Since a fast fourier transformer 25,25' is present in the receiver 20 a much more efficient way to implement such a convolution is to translate this equation to the frequency domain by calculating the following simple product of both fast fourier transformations. The convolution theorem says, that convolving two sequences is the same as multiplying their fourier transforms. A way to write that down is:

$$X=fft([x\ zeros(1,Nc)])\ and\ Y=fft([y\ zeros(1,Nc)])$$

Then: conv(x,y)=ifft(X.*Y)

For example, it can be written that:

$$coef=abs(ifft(fft(h1,64)'*fft(h2,64))/(64*64))$$

to find the correlation coefficient between the vectors h1 and h2 on a 64-point fast fourier transformation which is also the length of the observation of h1 and h2.

$$Rho'=FFT(h1,Nc) \cdot FFT(h2,Nc)/(Nc*Nc). \quad (6)$$

A normalized correlation factor Rho' is applied to have a perfect equivalence.

If a SNR estimation is to be made and the measured correlation values are to be normalized using the power, then use of the Parseval theorem can be made to calculate the power in the fast fourier transformation domain.

The power within h1:

time domain: $pw1=sum(abs(h1^2))/64$ frequency domain: $pwfft1=sum(abs((fft(h1,64))^2))/(64*64)$ The power within h2:

time domain: $pw2=sum(abs(h2^2))/64$ frequency domain: $pwfft2=sum(abs((fft(h2,64))^2))/(64*64)$ Normalization of the correlation factor with the power of h1 and h2:

$$Rnorm=Rho*sqrt(pw1/pw2)$$

The eigenvalues are estimated by calculating if necessary the mean highest and lowest eigenvalues for a (2,2) multiple input multiple output Rayleigh case with the relationship (7):

$$\lambda_{max}=0.5*rho+3.5$$

$$\lambda_{min}=4-\lambda_{max} \quad (7)$$

This directly suggests that all the algorithms using estimated eigenvalues can be adapted and make use of the correlation value estimation. Once the estimated eigenvalues are known from the correlation factor still the associated eigenvectors should be estimated. The estimated eigenvalues are modeled to be constant over the length of calculation of rho (i.e. Nc carriers). The eigenvectors are estimated by:

$$\alpha=-\pi/4(sqrt(rho))$$

$$\rho=(1-sqrt(2)/2)*rho*rho+sqrt(2)/2 \quad (8)$$

Figure 5:
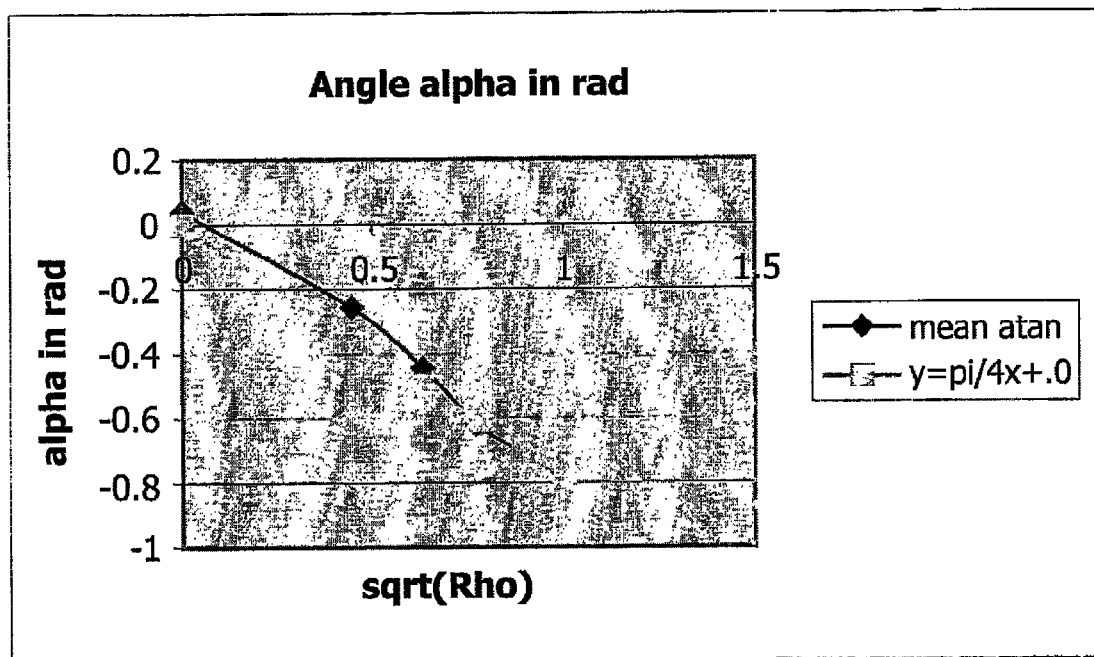
FIG. 5 shows eigenvector estimations versus correlations.
Figure 5:
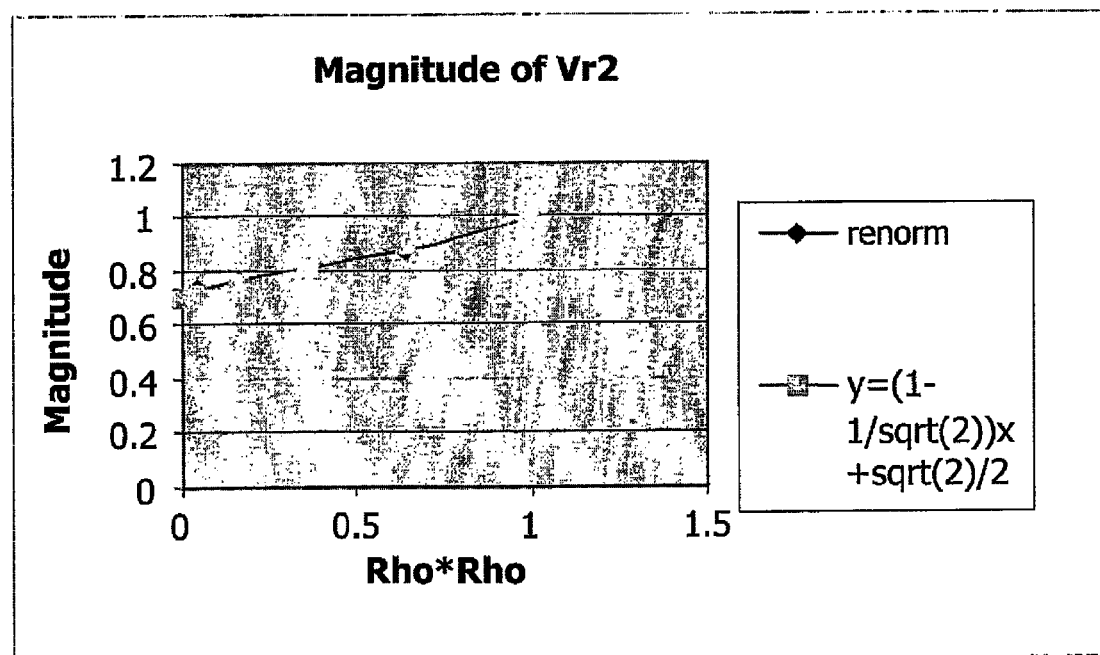

FIG. 5 shows the eigenvectors estimations.

So, the apparatus 1 according to the invention as shown in FIG. 1 comprises the receiver 20 according to the invention for receiving radio frequency signals or optical signals via radio frequency channels or optical channels defined by the channel transfer matrix H and comprises the transmitter 10 according to the invention, which receiver 20 according to the invention comprises:

the channel estimator 30 for generating first and second channel estimation information h1,h2 or FFT(h1,Nc),FFT(h2,Nc) and possibly for generating third and fourth channel estimation information etc.;

the correlator estimator 31 for correlating the first and second channel estimation information with each other by either multiplying the FFT(h1,Nc) and the FFT(h2,Nc) or by fast fourier transformating h1 and h2 and then multiplying the transformations FFT(h1,Nc) and FFT(h2,Nc) and for, in response to the correlation, generating the correlation factor Rho, and for possibly correlating the first and third, the first and fourth, the second and third, the second and fourth and the third and fourth channel estimation information etc.; and the transmitting feedback unit 32 for, in dependence of the correlation factor, estimating eigenparameters such as estimated eigenvalues $\lambda_{min},\lambda_{max}$ of a covariance matrix $HH^H$ and/or estimated eigenvectors $\alpha$ and $\rho$ and for, in response to the estimation, generating the feedback information;

and which transmitter 10 according to the invention comprises:

the receiving feedback unit 33 for receiving the feedback information for adjusting the transmitter 10 according to the invention, which adjusting may comprise the adjusting of the selector 35 for selecting a transmitter algorithm or a transmitter mode and/or may comprise the adjusting of the sending units 16,16' for adjusting transmission parameters.

In the apparatus 1 according to the invention, the receiver 20 according to the invention further comprises:

a power estimator 34 for estimating a first and second power value for the first and second channel estimation information for normalizing the correlation factor Rho and for getting a normalized correlation factor Rho'.

In the apparatus 1 according to the invention, either the feedback information comprises the estimated eigenparameters, or the feedback information comprises a code which depends on the correlation factor Rho. This code for example instructs the transmitter 10 in the apparatus 1 to use either a multiple input multiple output technology or to use an ordinary (antenna) diversity technology or both, and/or is used for making the selection via the selector 35 and/or is used for the adjustment of the transmission parameters. To convert the estimated eigenparameters into one or more codes, the transmitting feedback unit for example comprises a table memory with values and a comparator for comparing the correlation factor with the values.

Figure 6:
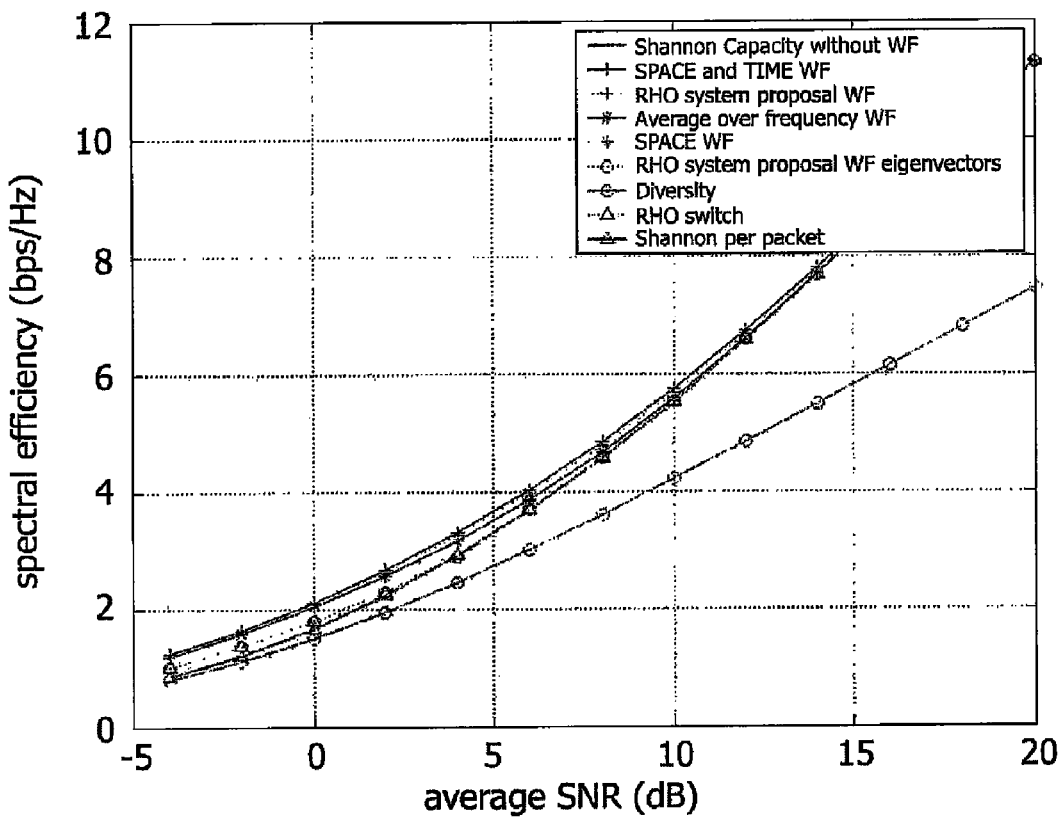
FIG. 6 shows spectral efficiencies for various water filling schemes for two different correlation factors.
Figure 6:
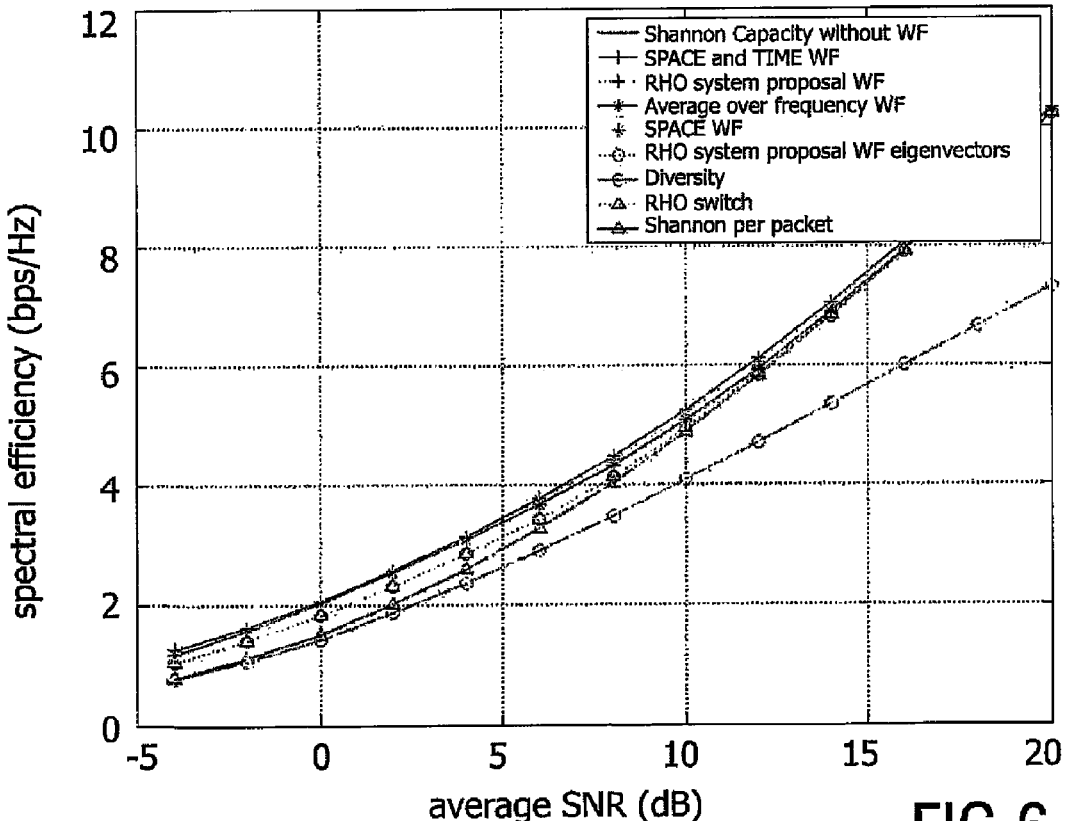
Figure 7:
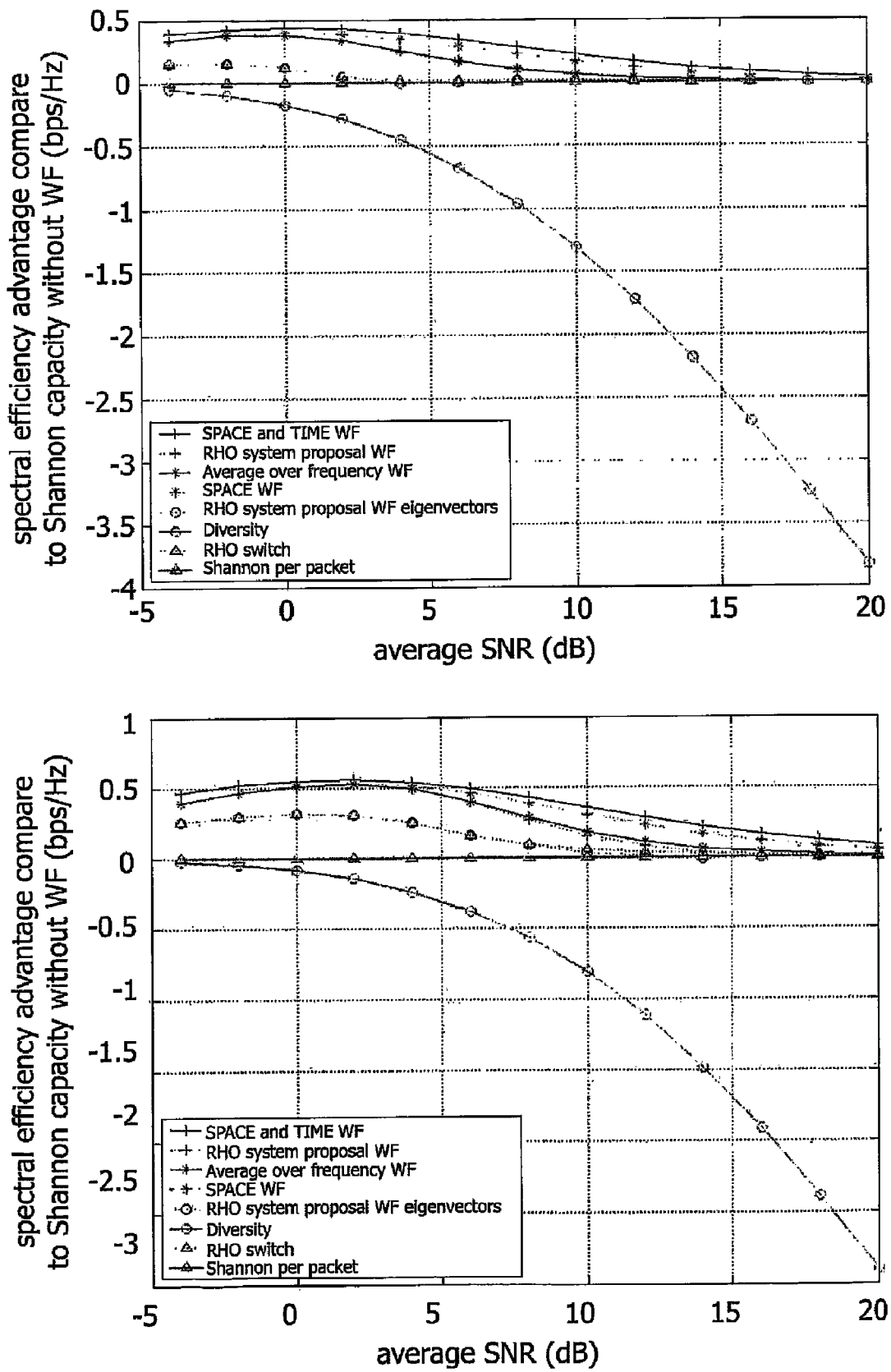
FIG. 7 shows percentages of spectral efficiency gains compared to Shannon capacities without water filling for two different correlation factors for 48 carriers.
Figure 8A:
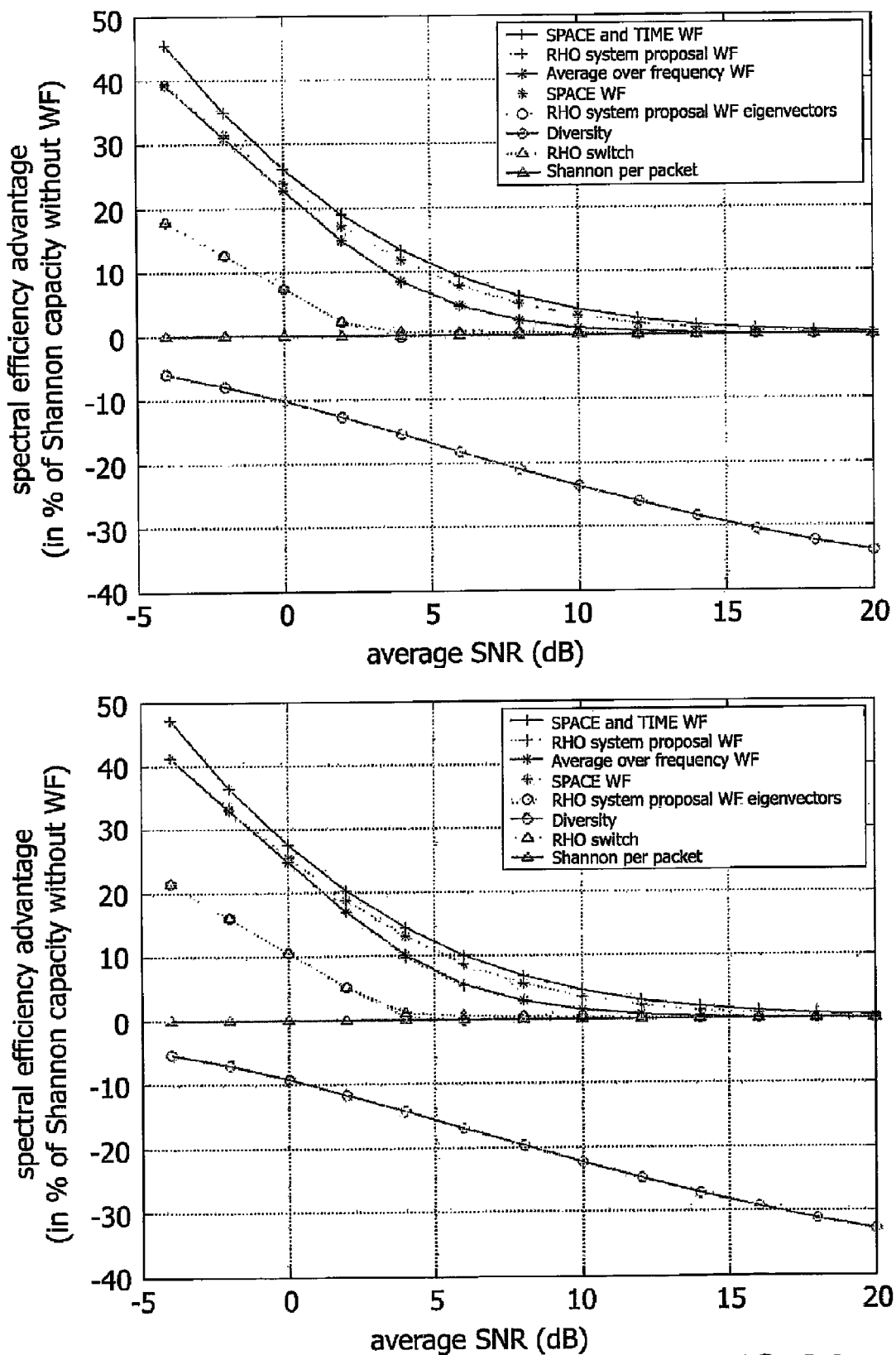
FIG. 8 shows percentages of spectral efficiency gains compared to Shannon capacities without water filling for 48 carriers.
Figure 8B:
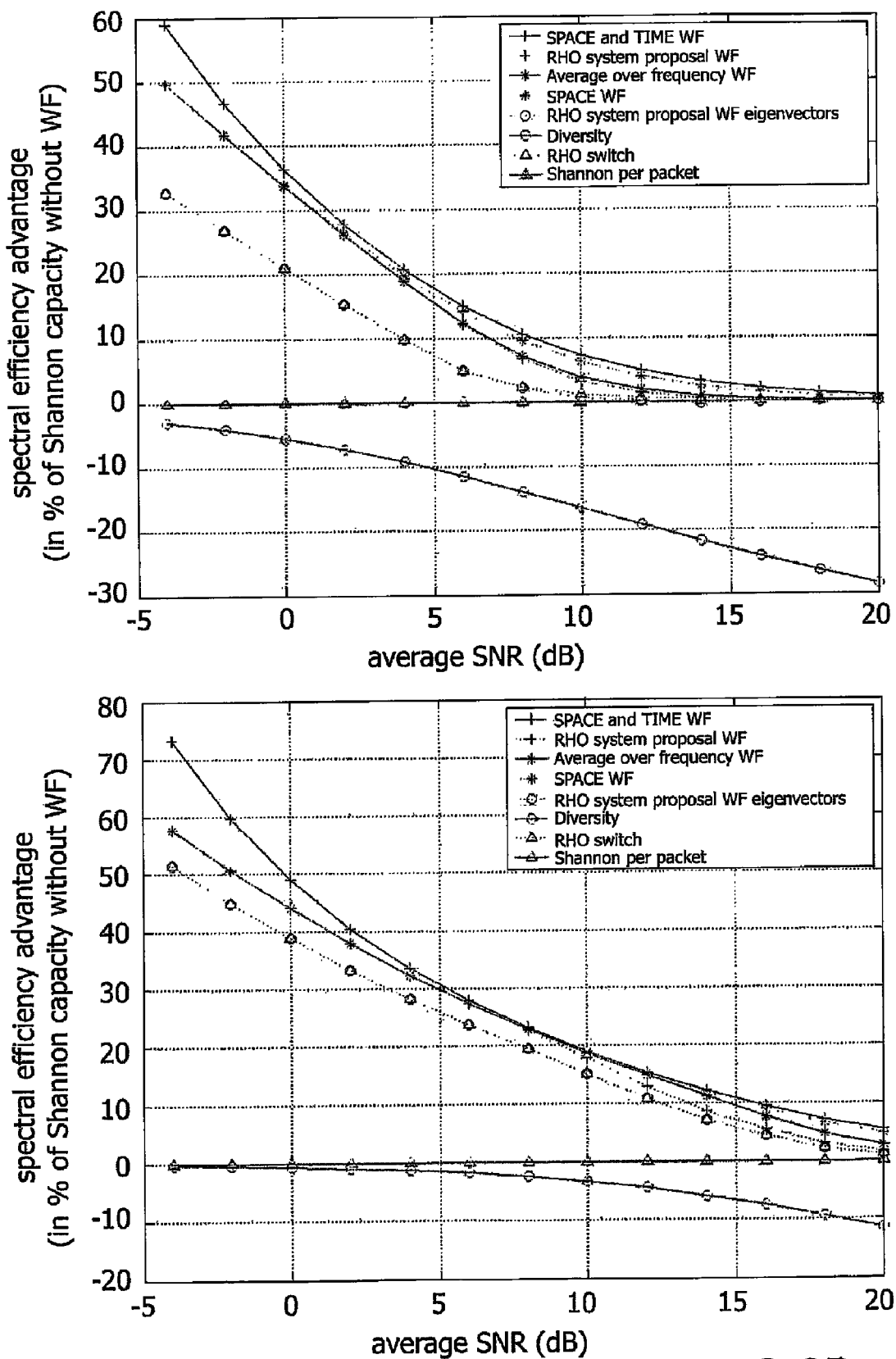

Some simulations are shown in FIG. 6-8: FIG. 6 shows spectral efficiencies for various water filling schemes for two different correlation factors Rho=0.1 (upper plot) and Rho=0.6 (lower plot). FIG. 7 shows percentages of spectral efficiency gains compared to Shannon capacities without water filling for two different correlation factors Rho=0.1 (upper plot) and Rho=0.6 (lower plot) for Nc=48 carriers. FIGS. 8A and 8B show percentages of spectral efficiency gains compared to Shannon capacities without water filling for Nc=48 carriers. Of course, it is up to the implementation to decide which number of carriers Nc is to be used for estimating the correlation: When taking for example one out of two carriers, the complexity is further reduced while keeping most of the performance gain.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. Apparatus comprising a receiver for receiving signals via channels defined by a channel transfer matrix H and a transmitter, wherein:
the receiver comprises:
a channel estimator adapted to generate first and second channel estimation information;
a correlator estimator adapted to correlate the first and second channel estimation information with each other and, in response to the correlation, to generate a correlation factor; and
a transmitting feedback unit adapted to estimate eigenparameters of a covariance matrix $HH^H$ in dependence on the correlation factor, and to generate feedback information in response to the estimation; and
the transmitter comprises:
a receiving feedback unit adapted to receive the feedback information for adjusting the transmitter.

2. Apparatus according to claim 1, wherein the first and second channel estimation information has been fourier transformed.

3. Apparatus according to claim 1, wherein the first and second channel estimation information has not been fourier transformed and is fourier transformed in the correlator estimator before the correlation is done.

4. Apparatus according to claim 1, wherein the receiver further comprises:
a power estimator adapted to estimate a first and second power value for the first and second channel estimation information for normalizing the correlation factor.

5. Apparatus according to claim 1, wherein the estimated eigenparameters comprise estimated eigenvalues, a maximum estimated eigenvalue equals a sum of a first factor and a product, which product equals the correlation factor multiplied by a second factor, and a minimum estimated eigenvalue equals a difference between a third factor and the maximum estimated eigenvalue.

6. Apparatus according to claim 1, wherein the estimated eigenparameters comprise estimated eigenvectors, a first estimated eigenvector equals a first product of a fourth factor and a square root of the correlation factor, and a second estimated eigenvector equals a sum of a fifth factor and a second product, which second product equals a sixth factor multiplied by a third product, which third product equals the correlation factor multiplied by itself.

7. Apparatus according to claim 1, wherein the feedback information comprises the estimated eigenparameters.

8. Apparatus according to claim 1, wherein the feedback information comprises a code which depends on the correlation-factor.

9. Apparatus according to claim 1, wherein the transmitter further comprises:
a selector adapted to select a transmitter adjustment in dependence on the feedback information.

10. A device comprising an apparatus, wherein the apparatus comprises a receiver for receiving signals via channels defined by a channel transfer matrix H and a transmitter, wherein
the receiver comprises:
a channel estimator adapted to generate first and second channel estimation information;
a correlator estimator adapted to correlate the first and second channel estimation information with each other and for, in response to the correlation, to generate a correlation factor; and
a transmitting feedback unit adapted to estimate eigenparameters of a covariance matrix $HH^H$ in dependence on the correlation factor, and to generate feedback information in response to the estimation; and
the transmitter comprises:
a receiving feedback unit adapted to receive the feedback information for adjusting the transmitter.

11. The device according to claim 10, wherein the receiver further comprises:
a power estimator adapted to estimate a first and second power value for the first and second channel estimation information for normalizing the correlation factor.

12. The device according to claim 10, wherein the transmitter further comprises:
a selector adapted to select a transmitter adjustment in dependence on the feedback information.

13. Receiver adapted to receive signals via channels defined by a channel transfer matrix H for use in an apparatus, wherein the apparatus further comprises a transmitter, the receiver comprising:
a channel estimator adapted to generate first and second channel estimation information;
a correlator estimator adapted to correlate the first and second channel estimation information with each other and for, in response to the correlation, to generate a correlation factor; and a transmitting feedback unit adapted to estimate eigenparameters of a covariance matrix $HH^H$ in dependence on the correlation factor, and to generate feedback information in response to the estimation.

14. The receiver according to claim 13, wherein the receiver further comprises:
a power estimator adapted to estimate a first and second power value for the first and second channel estimation information for normalizing the correlation factor.

15. Transmitter for use in an apparatus, wherein the apparatus further comprises a receiver adapted to receive signals via channels defined by a channel transfer matrix H, wherein the receiver comprises:
a channel estimator adapted to generate first and second channel estimation information;
a correlator estimator adapted to correlate the first and second channel estimation information with each other and for, in response to the correlation, to generate a correlation factor; and
a transmitting feedback unit adapted to estimate eigenparameters of a covariance matrix $HH^H$ in dependence on the correlation factor, and to generate feedback information in response to the estimation; and
the transmitter comprises:
a receiving feedback unit adapted to receive the feedback information for adjusting the transmitter.

16. The transmitter according to claim 15, wherein the transmitter further comprises:
a selector adapted to select a transmitter adjustment in dependence on the feedback information.

17. Method for use in an apparatus for receiving signals via channels defined by a channel transfer matrix H, the method comprising the steps of:
generating first and second channel estimation information;
correlating the first and second channel estimation information with each other,
in response to the correlation, generating a correlation factor;
in dependence on the correlation factor, estimating eigenparameters of a covariance matrix $HH^H$; and
in response to the estimation, generating feedback information for adjusting the apparatus.

18. The method of claim 17, wherein the method further comprises:
estimating a first and second power value for the first and second channel estimation information for normalizing the correlation factor.

19. The method of claim 17, wherein the method further comprises:
selecting a transmitter adjustment in dependence on the feedback information.

20. A tangible memory, readable by a processor, the memory embodying a computer program for use in an apparatus for receiving signals via channels defined by a channel transfer matrix H, the computer program comprising computer readable code for:
generating first and second channel estimation information;
correlating the first and second channel estimation information with each other,
in response to the correlation, generating a correlation factor;
in dependence on the correlation factor, estimating eigenparameters of a covariance matrix $HH^H$;
in response to the estimation, generating feedback information for adjusting the apparatus.

* * * * *